Feb. 2, 1932.  C. V. CAVAN  1,843,865
AUTOMATIC ELECTRICAL HUMIDIFIER
Filed Jan. 7, 1931
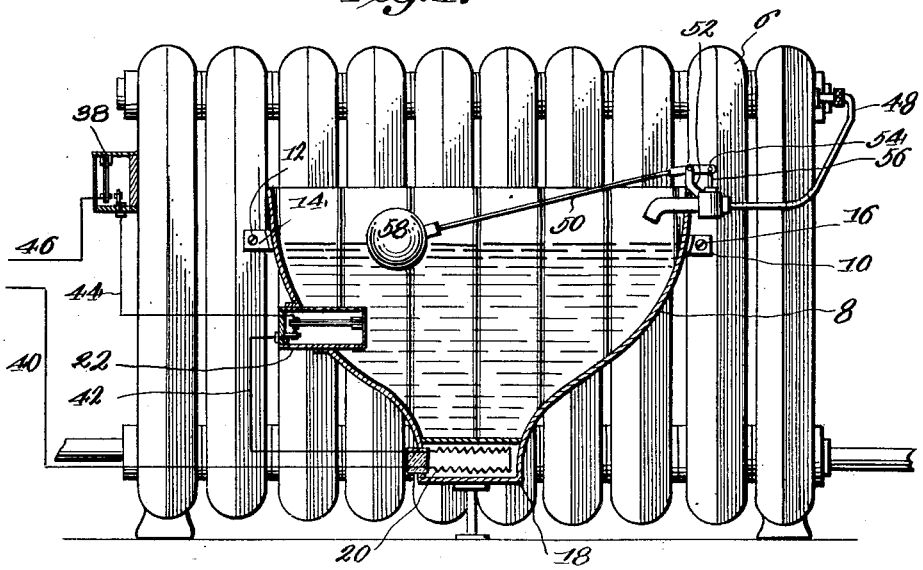
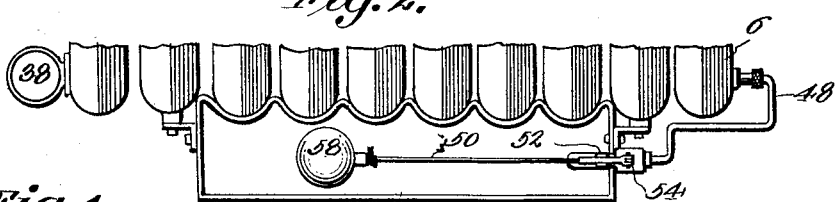
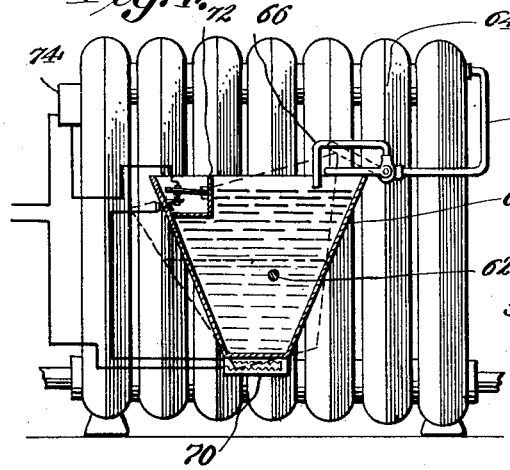
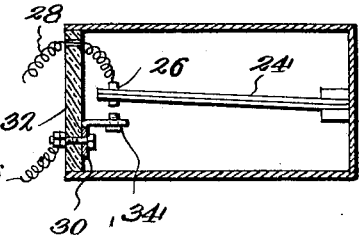
Inventor
CHARLES V. CAVAN
By Edw Flaherty
Attorney Patented Feb. 2, 1932

1,843,865

UNITED STATES PATENT OFFICE

CHARLES V. CAVAN, OF CHICAGO, ILLINOIS

AUTOMATIC ELECTRICAL HUMIDIFIER

Application filed January 7, 1931. Serial No. 507,256.

This invention relates to humidifiers and more particularly to an electrically controlled humidifier especially adapted for use on a radiator or the like.

One of the objects of this invention is to provide a humidifier which may be easily attached to the standard radiator.

Another object of the invention is to provide an electrically actuated humidifier, the operation of which is controlled by the combined temperature of the room and the radiator.

A still further object of the invention is to provide an automatically controlled water supply adapted to be connected to the water vent of the standard radiator.

A still further object of the invention is to provide a device of the class described which is easy to construct, cheap to manufacture and well adapted for use on standard radiators.

The invention contemplates the provision of an evaporator container or pan adapted to be connected to a radiator or the like and supplied with water from the radiator through an automatic valve controlled by the water lever in the container. The temperature of the water in the container is regulated by an electrical heating unit disposed in close proximity to the container and is supplied with electrical energy from a source of electrical supply through a pair of thermostatic switches.

In the accompanying drawings forming a part of this application and in which like numerals are employed to designate like parts throughout the same, Figure 1 is a front elevational view partly in section illustrating the manner in which the humidifier is connected to a radiator, Figure 2 is a plan view partly in section of Figure 1, Figure 3 is a sectional view illustrating the manner in which the bimetallic thermostatic elements are constructed, and Figure 4 is a front elevational view of a modified form of the invention.

Referring more particularly to Figure 1, the reference numeral 6 generally designates a hot water radiator of the standard construction. A water container or evaporating pan 8 is fixedly mounted on one side of the radiator 6 by means of screw bolts 10 and 12 engaging ears 14 and 16 on the side of the container.

As illustrated in the drawings, the evaporating pan 8 is of rectangular cross section and has sides which converge towards the lower extremity thereof. A partition member 18 divides the container 8 into two compartments and an electrical heating unit 20 is arranged in the lower compartment and insulated therefrom.

One side of the evaporating pan is provided with a recessed portion 22 in which there is arranged a bimetallic thermostatic switch. Referring more particularly to Figure 3, the bimetallic element 24 of the thermostatic switch is fixedly mounted at one end and is provided on the opposite end with the usual electrical contact 26 to which there is connected an electrical conductor 28.

A cooperating stationary contact arm 30 is secured to an insulating block 32 fixed in the end of the recessed chamber 22 and is provided with an adjustable electrical contact 34 which is connected to a conductor 36. By adjusting in the usual manner the electrical contact 34 with respect to the contact 26, the temperature at which the thermostatic element opens and closes the electrical circuit may be set for any predetermined temperature.

A similar bimetallic thermostatic switch 38 is secured to the radiator 6 and is included in an electrical circuit with the electrical heating element and the thermostatic switch 22 by means of conductors 40, 42, 44 and 46, the conductors 44 and 46 being connected to an electrical source of supply.

The evaporating container or pan 8 is supplied with water from the radiator through a conduit 48 connected to one end of the radiator. The other end of the conduit 48 is provided with a spigot adapted to direct the water into the evaporating pan and has arranged therein a valve which is actuated by a lever 50 pivotally mounted at its intermediate point on an upwardly directed arm 52 integral with the spigot. One end of the lever 50 is pivotally mounted at 54 to the valve actuating lever 56 and has arranged on its other end a float 58.

As is illustrated in the drawings, when the water evaporates to a certain level, the float will move downwardly and actuate the valve lever 56 and turn on the flow of water filling the evaporating pan to a predetermined level when by the rise of the float 58 the valve will close and shut off the flow of water.

The temperature of the water in the evaporating pan is controlled by the thermostatic switch 22 which may be adjusted to actuate at any predetermined temperature by the adjustable contact 34. The thermostatic switch 38 performs the functions of a safety device and is actuated by the temperature of the radiator. This thermostatic element likewise may be adjusted to actuate at any predetermined temperature by simply adjusting the movable contact which cooperates with the conduit on the bimetallic element. It will thus be seen that the thermostatic switch 22 which is directly responsive to the temperature of the water in the evaporating pan is also included in the electrical circuit with the thermostatic switch 38 so that the closing of the circuit of the electrical heating unit 20 not only depends upon the temperature of the water in the evaporating pan but also upon the temperature of the radiator.

As illustrated in Figure 4, the evaporating pan 60 may be pivotally mounted on a shaft 62 fixed to the radiator 64. As illustrated in the drawings, the evaporating pan is pivotally mounted on the shaft 62 at a point slightly below the center of the pan and to the right of the vertical center line thereof so that when the pan is filled with water to a predetermined level, the pan will assume an upright position and permit the valve which controls the flow of water therein to close. When the level of the water due to the evaporation thereof has fallen below a predetermined level, the pan will tilt in an anticlockwise direction and the upper right hand corner thereof will abut against the valve lever 64 to open the valve and cause the water to flow into the pan through the spigot 66 which is connected to the radiator through the conduit 68. The flow of water will continue through the spigot into the evaporating pan until the predetermined level has been reached when the pan by virtue of the weight of the water will assume again its upright position.

The evaporating pan as illustrated in Figure 1 is provided with a heating unit 70 which is connected to a source of electrical supply through the thermostatic switches 72 and 74, respectively, connected to the evaporating pan and the radiator. The thermostatic switches function in the same manner as those described with respect to Figure 1.

While this invention has been described in detail as applied to the radiator of a hot water heating system, it is to be understood that it may be equally applied to hot air furnaces, steam or the like. In applying this humidifier to a hot air furnace, it would be mounted in the drum of the furnace and the water supplied thereto from the hot water service pipes. When used in connection with a vapor heating medium, the water is piped to the radiators and in the case of steam heat the condensed water is employed.

While I have described my invention with respect to the particular embodiments it is to be understood that minor changes in detail may be made without departing from the spirit and scope of the invention as set forth in the appended claims.

Having thus described the invention, what is claimed is:

1. In combination with a radiator, an automatic humidifier comprising an evaporating pan fixed to said radiator, a water conduit connecting said radiator with said evaporating pan, means for maintaining a predetermined level of water in said evaporating pan, an electrical heating element associated with said evaporating pan, a thermostatic switch in close proximity with said evaporating pan, a second thermostatic switch on said radiator, said thermostatic switches and said electrical heating unit being connected in circuit with a source of electrical supply.

2. An automatic electrical humidifier adapted to be associated with a radiator comprising an evaporating pan, means for supplying water in said evaporating pan, means for maintaining said water at a predetermined level in said evaporating pan, an electrical heating unit associated with said evaporating pan, an adjustable thermostatic switch in close proximity to said pan, a second thermostatic switch on said radiator, said thermostatic switches and said electrical heating element being included in circuit with an electrical source of supply.

3. In combination with a radiator, an evaporating pan rotatably mounted on said radiator, a conduit connected to said radiator for supplying water in said evaporating pan, a valve connected to said conduit, said evaporating pan being adapted to be maintained in a normally upright position when filled with water at a predetermined level and upon evaporation of said water to rotate and actuate said valve to refill said pan with water whereby said pan again assumes its normally upright position, an electrical heating element associated with said evaporating pan, an adjustable thermostatic switch disposed in a recess in said pan, a second thermostatic switch fixed to said radiator, said thermostatic switches and said electrical heating unit being included in circuit with a source of electrical supply.

4. In combination with a heating element, a humidifier comprising an evaporating pan associated with said heating element, a hot water supply connected to said evaporating pan, means for normally maintaining a predetermined level of water in said pan, an electrical heating unit associated with said pan, a thermostatic switch associated with said evaporating pan, a second thermostatic switch in close proximity to said heating unit, said thermostatic switches and said electrical heating unit being included in an electrical circuit with a source of electrical supply.

In testimony whereof I affix my signature.

CHARLES V. CAVAN.